United States Patent Office 2,828,302
Patented Mar. 25, 1958

2,828,302

COENZYME CONCENTRATES AND METHODS FOR THE PREPARATION THEREOF

Milton A. Mitz, Chicago, Ill., assignor to Armour and Company, Chicago, Ill., a corporation of Illinois No Drawing. Application February 1, 1956
Serial No. 562,654

7 Claims. (Cl. 260—211.5)

This invention relates to the preparation of coenzyme concentrates. The invention is particularly useful in the treatment of a crude mixture of coenzymes to concentrate the mixture and separate it into its component coenzymes.

Recent work in the enzyme field has resulted in the isolation and characterization of a group of small, water-soluble molecules which have been named coenzyme and which are believed each to form an essential part of various complete enzyme molecules. Such work has established that the presence of the proper coenzyme is indispensable to a large class of enzymes in their functioning as catalysts or activators in certain reactions of metabolism in the body. For example, coenzymes such as triphosphopyridine nucleotide (TPN, coenzyme II) and diphosphopyridine nucleotide (DPN, coenzyme I, cozymase) have been found to form an essential part of certain oxidation enzymes which promote the metabolic reactions by which foods are oxidized for the release of energy. The newly discovered coenzyme A appears to be a component of at least two different metabolic enzymes since it has been shown to affect both the oxidation and acetylation processes in the body.

Further work in this field has demonstrated that the coenzyme itself may be broken down into two or more components and that in most cases the important component is a vitamin. Thus the coenzyme flavin adenine dinucleotide (FAD) contains as a prosthetic group the vitamin riboflavin; coenzyme A contains the vitamin pantothenic acid; the coenzymes triphosphopyridine nucleotide (TPN) and diphosphopyridine nucleotide (DPN) contain niacine; etc. The coenzymes are often spoken of in the literature as one form of the "bound" vitamin, since the vitamin is bound to a further chemical group to make up the coenzyme.

Thus, at least one of the functions of a vitamin, upon being taken into the body, is to combine with other necessary chemicals in the body to form a coenzyme, which in turn combines with a protein (apoenzyme) to produce the complete enzyme, thus providing the desired agent for promoting various metabolic changes necessary for nutrition of the body. Of the known water soluble vitamins, thiamine, riboflavin, pyridoxine, biotin, pantothenic acid, and niacin have been shown to exert their physiological action as described above.

In certain pathological conditions in human beings such as intestinal block, liver damage, and thyroid malfunction, the normal conversion of vitamins into the functional coenzyme form is prevented. Since the coenzyme form of the vitamin is the effective agent in metabolic processes, this inability to convert the vitamin, and other similar conditions of imbalance, can be overcome by administering the vitamin in the coenzyme form. From this it may be seen that there is a demand for simple, practical methods for obtaining coenzymes from available natural sources and treating them to provide concentrated preparations suitable for administration as indicated above. Coenzymes have been shown to be distributed widely in animal and plant cells, where they play their roles in the various metabolic functions referred to above, and methods have been described for extracting coenzymes from animal tissue, such as the liver, of slaughtered animals. Also, it is known that many microorganisms contain large amounts of coenzymes, and fermentation with some of these has been carried out to produce certain of the coenzymes. The known methods, such as those mentioned above, ordinarily result in crude aqueous preparations containing an individual coenzyme, or mixture of coenzymes, together with considerable quantities of inert contaminating materials; and, although procedures have been described for further purifying these crude preparations, such procedures have been lengthy operations involving as many as 35 or 40 separate steps and being cumbersome to the extent that any large scale practice of these methods would be considered commercially impractical.

It is an object of the present invention to provide a simple, practical method for treating a crude coenzyme solution to obtain a concentrated coenzyme preparation therefrom. Another object of the invention is to provide a process in which a coenzyme is obtained from a crude solution by sorption on a particularly effective sorption agent and the coenzyme subsequently extracted from the sorption agent in concentrated form. A further object is to provide a process for concentrating and separating into its component coenzymes a mixture containing the coenzymes triphosphopyridine nucleotide, diphosphopyridine nucleotide, and coenzyme A. Other specific objects and advantages will appear as the specification proceeds.

I have found that a crude aqueous solution of dinucleotide coenzymes may be treated effectively to produce a coenzyme concentrate by mixing the solution with an ion exchange material, having a low cross-linkage content, at an alkaline pH to cause sorption of the coenzyme on the ion exchanger and thereafter extracting the coenzyme from the exchanger with an acidified desorption agent. I have found that this procedure may be applied to a crude solution containing a single dinucleotide coenzyme, to concentrate the coenzyme, or to a crude mixture of dinucleotide coenzymes to obtain a concentrated mixture of such coenzymes and, if desired, to separate the mixture into its component coenzymes.

For example, in one embodiment of the invention, a crude mixture of dinucleotide coenzymes found in animal liver material, and obtained therefrom by hot water extraction, is adjusted to a pH of 7 to 8 and is passed through a column of ion exchange material to cause sorption of the mixture of coenzymes on the exchanger while allowing contaminants to remain in solution. After washing, the mixture of coenzymes is extracted from the exchanger by passing an acidified solvent, such as for example a 0.1 N hydrochloric acid solution, through the exchanger.

In the practice of the present invention, I may use as the starting material any suitable solution containing a dinucleotide coenzyme or a mixture of such coenzymes. For example, animal liver material contains many of the known dinucleotide coenzymes, and a crude aqueous solution containing a single coenzyme or a mixture thereof may be prepared from such material by mixing the material with hot water and heating for a period of time. The heating period may be varied, according to whether it is desired to extract a single coenzyme, such as coenzyme A, or a mixture of coenzymes, such as a mixture containing coenzyme A, triphosphopyridine nucleotide, and a diphopshopyridine nucleotide, all of the foregoing being characterized as dinucleotide coenzymes. The resulting crude aqueous solution, containing either a single dinucleotide coenzyme or a mixture, may be used as a starting material in the present invention. Solutions of such coenzymes from other sources, such as by fermentation with microorganisms, may also be employed.

The sorption agent with which the above starting material is mixed may be any suitable ion exchange material having a low cross-linkage content. An agent which has been found to be particularly suitable is an amine-containing resin sold commercially under the name Dowex 1, which resin has a cross-linkage content of about 8%. The "cross-linkage content" of ion exchange materials is a regularly determined characteristic, information concerning which is ordinarily supplied by the manufacturer in the cataloging and sales of his materials. The "cross-linkages" in the case of the phenol-formaldehyde type resins, for example, refer to the methylene bridges which serve to link adjacent phenol molecules together, and the number and percentage content of these or other cross-linkages can readily be determined. It has been determined, for the purpose of the present invention, that best results are achieved if the cross-linkage content of the ion exchange material is relatively low. A cross-linkage content of approximately 6–8% is particularly suitable, while figures much above 10% are in the area where the exchanger shows a material reduction in effectiveness. The usefulness of the ion exchangers contemplated by the present invention may be enhanced if, before use in the process, they are washed with a solution or solutions the same as those which are to be used as desorption agents in subsequent stages of the procedure.

Actual sorption of the coenzymes from solution may be achieved in any suitable manner, as for example holding the sorption agent in a column and passing a solution of the coenzymes through the column. It is preferable that the sorption take place from an alkaline solution of the coenzymes.

After the coenzymes have been removed from solution by sorption on the sorption agent, the solid material may be washed with water or dilute acid, and the coenzymes are next extracted from the solid material with an acidified desorption agent. Such agent may be any suitable acid, such as hydrochloric or formic, and a mixture of such acid with a suitable salt, such as sodium formate, has been found to provide exceptionally good results as the desorption solution.

After the desorption step, the effluent liquid is treated to recover the coenzymes as a dry product. This may be by any suitable method, such as, for example, precipitation from large volumes of acetone.

By employing the above method, it is possible to treat a crude solution containing a dinucleotide coenzyme, or a mixture of such coenzymes, to provide a concentrated, purified coenzyme product. When applied to a solution containing a mixture of such coenzymes, the procedure may be adjusted to recover a concentrated mixture containing the same proportions of individual coenzymes with respect to the others; or, if desired, the procedure may be varied to separate each individual coenzyme from the others. Thus for example, I have found that a solid sorption agent containing a mixture of the coenzyme diphosphopyridine dinucleotide (DPN), triphosphopyridine dinucleotide (TPN) and coenzyme A may be treated with an acidified solvent so as to provide an effluent liquid of increasing acidity, with the result that successive cuts may be made of the effluent liquid and a predominance of a single different coenzyme found in each cut. In this connection, I have found that diphosphopyridine dinucleotide (DPN) may be found isolated in the cut having a pH of about 6.0 to 3.5; triphosphopyridine dinucleotide (TPN) in the cut having a pH of about 3.5 to 3.0; and coenzyme A in the pH range of about 2.0 to 1.8. I have also found that ionic strength has somewhat of an effect upon the above pH ranges, and that these ranges may be varied slightly by variations in the ionic strength. If it is desired to isolate triphosphopyridine dinucleotide (TPN) specifically, I have discovered that the optical density of the effluent liquid provides a convenient method for determining where the cut must be made. Thus, as the acidity of the effluent increases, the optical density of the solution (using a dilution of 0.3 ml. effluent plus 4.2 ml. distilled water) ordinarily drops to a minimum, then rises above 0.1 and finally again drops below 0.1; and if a separate cut is made of the solution during the period when the optical density is about 0.1, it is found that triphosphopyridine nucleotide (TPN) is isolated in this cut.

Specific examples of the process may be set out as follows:

Example 1

An ion exchange resin (Dowex 1, an anion exchange resin) was packed in a burette, providing a column 4 inches high, and this column was washed with 0.1 N hydrochloric acid until the effluent was the same pH as the solution entering the top of the column. Distilled water was passed through to remove the excess acid, which was evident when the effluent was the same pH as the distilled water used. A crude yellow solution of dinucleotide coenzymes was adjusted to a pH of 7 to 8 with sodium hydroxide and passed through the column until the color began to appear in the effluent liquid, indicating saturation. The resin was next washed with 10 ml. of water and 10 ml. of 0.03 N hydrochloric acid. A 10 ml. solution of 0.1 N hydrochloric acid was used to remove the mixture of coenzymes from the ion exchange resin in the column. The effluent liquid was added to 9 volumes of cold acetone, centrifuged, and the precipitate washed with acetone, ether, and dried. The dried product weighed 23.5 mg. and analyzed as 25 u. CoA/mg., 8.20% TPN, and 2.4% DPN.

Example 2

A portion of 200 to 400 mesh ion exchange resin (Dowex 1) was washed batch-wise with 2 N hydrochloric acid until the optical density of the effluent liquid was below 0.05 at 260 mu (Beckman spectrophotometer, model D. U.). Then the resin was washed with 2 N sodium formate until no trace of chloride ion was found in the effluent. The resin was then washed with distilled water to free it of excess sodium formate.

The resin was then slurried into a glass column and allowed to settle. A solution of dinucleotide coenzymes was slowly added to avoid disturbing the column, and when the solution had drained to the surface a solution containing 0.1 M sodium formate and 0.1 M formic acid was added. All the effluent liquid leaving the column within the pH range of 6.0 to 3.5 was collected separately and was found to contain a concentration of DPN, with no TPN or CoA. The cut leaving the column at a pH of from 3.5 to 3.0 contained a concentration of TPN with no significant quantities of DPN or CoA. The cut having a pH of 2.0 to 1.8 contained CoA in concentrated form with substantially no DPN or TPN.

In the foregoing examples, the percentages of triphosphopyridine nucleotide (TPN) and diphosphopyridine nucleotide (DPN) are expressed in terms of weight percentages. With respect to coenzyme A, the yields have been expressed as units of coenzyme A activity per milligram (u. CoA/mg.). The generally accepted unit of coenzyme A activity is that which has been described and defined by Kaplan and Lipman in the Journal of Biological Chemistry, volume 174 (1948), page 37.

This application is a continuation-in-part of my application Serial No. 232,670, filed June 30, 1951, now abandoned.

While in the foregoing description I have set out steps of the process in considerable detail for the purpose of illustrating embodiments of the invention, it will be understood that such details may be varied widely by those skilled in the art without departing from the spirit of my invention.

I claim:
1. In a process for preparing a dinucleotide coenzyme concentrate in which an active extract of the coenzyme is obtained from solution by sorption on an anion-exchange material, the step of extracting said dinucleotide coenzyme from said ion-exchange material with an acidified desorption agent.

2. In a process for preparing a coenzyme A concentrate in which an active extract of the coenzyme is obtained from solution by sorption on an anion-exchange material having a low cross-linkage content, the step of extracting said coenzyme A from said ion-exchange material at a pH of about 1.8 to 2.0.

3. In a process for preparing a coenzyme A concentrate in which an active extract of the coenzyme is obtained from solution by sorption on an anion-exchange material having a low cross-linkage content, the step of extracting said coenzyme A from said ion-exchange material with hydrochloric acid at a pH of about 1.8 to 2.0.

4. In a process for preparing a concentrate of the coenzyme diphosphopyridine nucleotide in which an active extract of the coenzyme is obtained from solution by sorption on an anion-exchange material having a low cross-linkage content, the step of extracting said coenzyme from said ion-exchange material at a pH of about 3.5 to 6.0

5. In a process for preparing a concentrate of the coenzyme triphosphopyridine nucleotide in which an active extract of the coenzyme is adsorbed on an anion-exchange material having a low cross-linkage content, the step of extracting said coenzyme from said ion-exchange material at a pH of about 3.0 to 3.5.

6. In a process for concentrating and separating into its component coenzymes a mixture containing the coenzymes triphosphopyridine nucleotide, diphosphopyridine nucleotide, and coenzyme A, the steps of causing sorption of said mixture of coenzymes on an anion-exchange resin, having a cross-linkage content no higher than about 10%, mixing said ion exchange resin containing the mixture of coenzymes with a desorption agent, adjusting the pH of the mixture downward through the pH range of about 3.5 to 6.0 to cause desorption of diphosphopyridine nucleotide while allowing the other coenzymes to remain combined with the ion exchange resin, mixing the resin and remaining coenzymes with fresh portions of desorption agent, adjusting the pH of the mixture downward through the pH range of 3.0 to 3.5 to cause desorption of triphosphopyridine nucleotide while allowing coenzyme A to remain combined with the ion exchange resin, and finally mixing the remaining solid material with fresh portions of desorption agent at a pH of 1.8 to 2.0 to cause desorption and recovery of coenzyme A.

7. In a process for concentrating and separating into its component coenzymes an alkaline mixture containing the coenzymes triphosphopyridine nucleotide, diphosphopyridine nucleotide, and coenzyme A, the steps of causing sorption of said mixture of coenzymes on an anion-exchange resin having a cross-linkage content no higher than about 10%, passing a solution of sodium formate and formic acid through said ion exchange resin having the mixture of coenzymes combined therewith, removing as a separate fraction the effluent which leaves said mixture in the pH range of 3.5 to 6.0 and recovering diphosphopyridine nucleotide from said fraction, removing as a second separate fraction the effluent which leaves said mixture in the pH range of 3.0 to 3.5 and recovering triphosphopyridine nucleotide from said second fraction, and finally mixing the remaining solid material with hydrochloric acid at a pH of 1.8 to 2.0 to cause desorption and recovery of coenzyme A.

References Cited in the file of this patent

Kunin et al.: "Analytical Chemistry," vol. 26, January 1954, page 106 relied on.

Kunin et al.: "Industrial and Engineering Chemistry," vol. 46, January 1954, page 119 relied on.